United States Patent [19]

Roovers et al.

[11] Patent Number: 4,724,657
[45] Date of Patent: Feb. 16, 1988

[54] APPARATUS FOR PRODUCING BAG PACKAGES FILLED WITH LIQUID

[75] Inventors: Gijsbertus C. F. Roovers, Weert; Piet van Berchum, El Valkerswaard, both of Netherlands

[73] Assignee: Robert Bosch GmbH, Stuttgart, Fed. Rep. of Germany

[21] Appl. No.: 16,700

[22] Filed: Feb. 19, 1987

[30] Foreign Application Priority Data

Apr. 11, 1986 [DE] Fed. Rep. of Germany ....... 3612197

[51] Int. Cl.⁴ .................... B65B 1/36; B65B 1/38; B65B 9/08
[52] U.S. Cl. ........................................ 53/551; 53/503
[58] Field of Search ............. 53/551, 552, 503, 266 R; 141/114, 83

[56] References Cited

U.S. PATENT DOCUMENTS

| | | | | |
|---|---|---|---|---|
| 2,687,740 | 8/1954 | Jarund | ........... | 53/503 X |
| 3,282,020 | 11/1966 | Smith | ........... | 53/551 |
| 3,831,821 | 8/1974 | Doyen | ........... | 53/503 X |
| 3,916,598 | 11/1975 | Adams et al. | ........... | 53/551 X |
| 4,606,174 | 8/1986 | Berg | ........... | 53/551 X |

Primary Examiner—Horace M. Culver
Attorney, Agent, or Firm—Edwin E. Greigg

[57] ABSTRACT

An apparatus for producing liquid-filled bag packages including a tube former for shaping a tube from a strip of packaging material. To introduce amounts of liquid into the end of the tube, a filling tube extends into the tube former with its outlet end having a metering valve. To supply the liquid to the filling tube, the filling tube has, on its end located at the height of the inlet opening of the tube former, a crosswise extending supply fitting, the end face of which is closed with a flexible diaphragm. To actuate the valve, a rod extending in the filling tube is pivotably connected at the height of the supply fitting with a lever, which is pivotably connected to an adjusting cylinder. For pivoting of the lever, the lever has two crosswise arms, which are pivotably connected to connecting rods, the longitudinal axes of which intersect one another in the center of the diaphragm.

6 Claims, 4 Drawing Figures

APPARATUS FOR PRODUCING BAG PACKAGES FILLED WITH LIQUID

BACKGROUND OF THE INVENTION

The invention is based on an apparatus for producing liquid-filled bag packages. In an apparatus of this kind known for example from German patent document DE-A No. 2 355 957, the filling fitting communicates above the tube former with the filling tube, which protrudes far beyond the tube former, and the actuating rod for the metering valve is connected to an adjusting cylinder at the upper end of the filling tube.

OBJECT AND SUMMARY OF THE INVENTION

The apparatus according to the invention has the advantage that by means of the product supply line and the valve actuation in the vicinity of the inlet opening of the collar, there is space available above the tube former for other devices for acting upon the packaging material and/or upon the product, such as a device for fastening dispensing fitments for the product to the bag packages.

A particularly advantageous feature is recited, with which the actuating lever can be passed through the wall with its pivot axis in the wall, yet without using a bearing and pivot shaft, thereby obviating sealing problems at this point. The diaphragm, which bulges in and out, also prevents turbulence from being transmitted to the product. Furthermore, little stress is put on the diaphragm, so that it has a very long service life.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
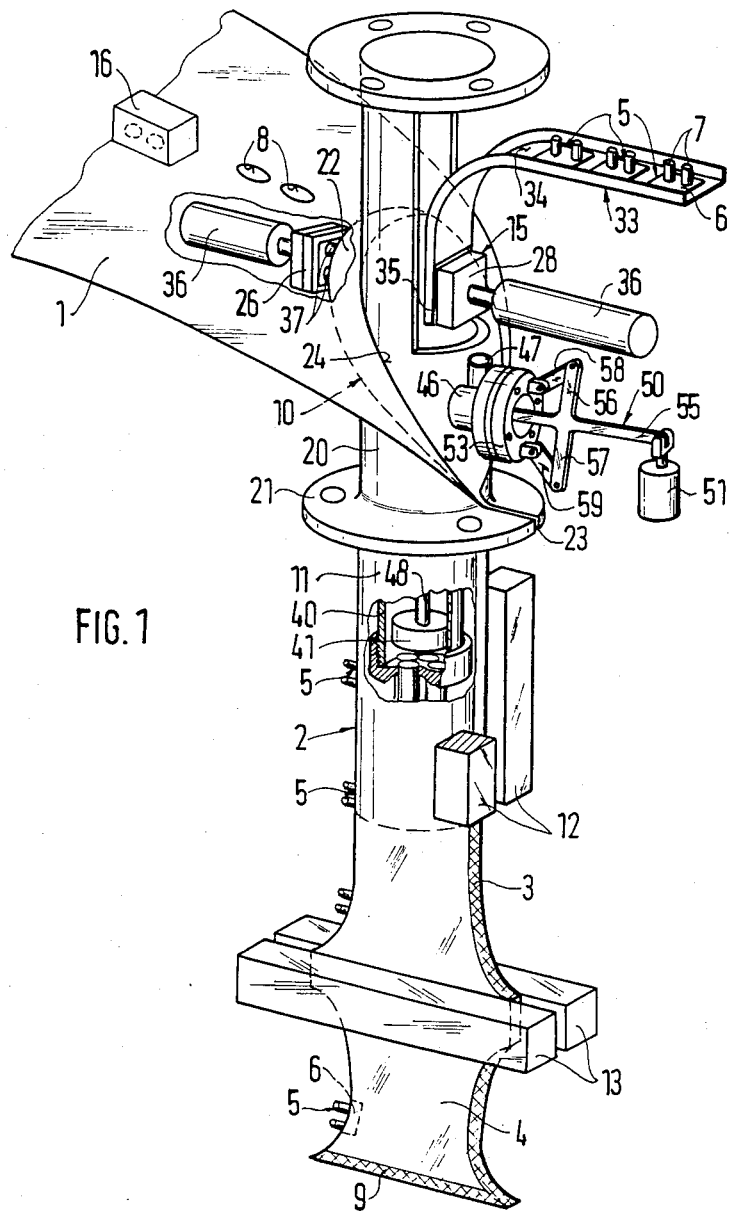
FIG. 1 shows an apparatus for forming, filling and closing of tubular bag packages having a dispensing fitment, in a perspective view.

A strip of packaging material 1 is unwound from a supply roll, not shown, and coated on at least one side so that it is heat-sealable and is guided via a forming shoulder 10, which shapes the material around a forming tube 11 into a tube 2. A pair of jaws 12 for heat-sealing lengthwise seams heat seals the two long edges, placed inside to inside, of the strip of packaging material 1 to form a lengthwise seam 3. A pair of jaws 13 for heat-sealing crosswise seams cuts off the tube 2, after one portion of a product at a time has been introduced into the formed bag, to form individual bag packages 4 and pulls the tube 2 downward by one bag length at a time. In the vicinity of the forming shoulder 10, there is a fastening device 15, which when the strip of packaging material 1 is stopped secures one dispensing fitment 5 at a time to the strip of packaging material 1 by heat sealing. The dispensing fitments 5 shown by way of example has two offstanding tubes 7 on each flange 6. The dispensing fitments 5, molded from a thermoplastic plastic, are heat sealed to the strip of packaging material with their flange 6 resting on the inside thereof, while their two tubes 7 protrude through holes 8 in the strip of packaging material 1, which are punched into the strip of packaging material 1 by a stamping device 16 located in front of the forming shoulder 10, as shown in FIG. 1.

The forming shoulder 10 comprises a guidance or tubular fitting 20 surrounding the forming tube 11 with a narrow gap and has a fastening flange 21, and a collar 22 surrounding the upper inlet opening; the strip of packaging material 1 passes over this collar and its diversion edge 24, which it shares with the inside of the tubular fitting 20, when the tube (2) is being formed. The upper inlet opening of the tubular fitting 20 is inclined relative to the longitudinal axis, so that in the direction of travel of the strip of packaging material, the collar 22 drops off from its apex, on the incoming side of the strip of packaging material, toward the other side. At the lower point on the collar 22, at which the two lengthwise edges of the strip of packaging material 1 are placed inside to inside against one another, the tubular fitting 20 and the flange 21 have a gap 23, through which the offstanding lengthwise edges travel when the strip of packaging material 1, or tube 2, is advanced.

Figure 3:
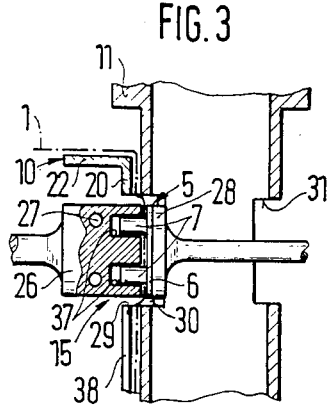
FIG. 3 shows part of the apparatus of FIG. 2 in cross section, in a second operating position.
Figure 4:
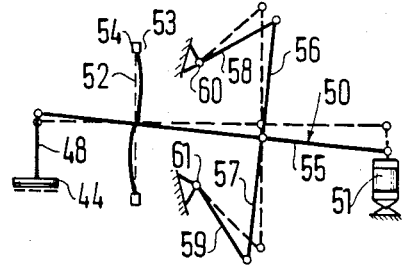
FIG. 4 shows the actuating mechanism of the filling device, in a simplified illustration.

The fastening device 15, which has a heat sealing stamp 26 with a heating device 27 and a holder 28, embodied as a counterpart stamp, for the dispensing fitments 5, is disposed in the upper portion of the forming shoulder 10, and their common working surface is located above the apex of the collar 22 (see FIG. 3). The sealing stamp 26 is disposed on the incoming side of the strip of packaging material 1, and the holder 28 is disposed displaceably on the side of the inlet opening of the forming shoulder 10, such that both the sealing stamp 26 and the holder 28 are displaceable crosswise to the longitudinal axis of the forming shoulder. To reach the strip of packaging material 1 in the working position, recesses 29, 30, 31 are provided in the tubular fitting 20 and in the forming tube 11, these recesses being in alignment with one another and adapted both to the shape of the sealing stamp 26 and holder 28 and to their paths of movement. To convey the dispensing fitments 5 into the working range of the fastening device 15, in particular in front of its holder 28, a conveyor device 33 having a guide groove 34 is disposed above the fastening device 15, the end 35 of the guide groove 34 being located between the forming tube 11 and the end face of the holder 28 in its retracted position (FIG. 1). To move the sealing stamp 26 and the holder 28 back and forth between an initial position, in which the two are remote from one another, and a working position, in which they are pressed together (FIG. 3), the sealing stamp 26 and the holder 28 are each connected to a respective hydraulic or pneumatic actuating cylinder 36. To fasten one dispensing fitment 5, the sealing stamp 26 and the holder 28 are moved toward one another, and located at the end 35 of the conveyor guide groove 34 receives a prepared dispensing fitment 5 and conveys it toward the strip of packaging material 1, whereupon the two tubes 7 of the dispensing fitment 5 penetrate the holes 8 of the positioned strip of packaging material 1 and finally the flange 6 comes to rest on the inside of the strip of packaging material 1, so that with the sealing stamp 26 likewise having been moved into position the flange 6 of the dispensing fitment 5 is pressed to the strip of packaging material 1 and is sealed to it by the transmission of heat by the sealing stamp 26

(FIG. 3). After a pressing time of a certain duration, the holder 28 and the sealing stamp 26 are retracted back out of the working position into their initial position. For receiving the tubes 7 of the fitment 5 during the sealing operation, the sealing stamp 26 has two suitably disposed blind bores 37 in its end face. For retaining a dispensing fitment 5 while it is being conveyed, suction bores, not shown, are provided in the end face of the holder 28; however, it is also possible to insert pins into the end face that slip into the tubes 7 to engage them.

The sealing attachment of a dispensing fitment 5 to the strip of packaging material 1 is effected while the strip of packaging material is at a standstill, during which time the lengthwise seam 3 is also formed by the pair of lengthwise seam sealing jaws 12, and the pair of crosswise seam sealing jaws 13 returns from a lower position to an upper initial position. After the closure of the pair of crosswise seam sealing jaws 13, this pair is moved downward, so that it advances the tube 2 and the strip of packaging material 1 by pulling them down by one bag length at a time, whereupon the tubes 7 of the dispensing fitment that protrude to the outside from the tube 2 are pulled through a lengthwise slit 38 in the tubular fitting 20 of the forming shoulder 10, below the recess 29, and the pair of crosswise sealing jaws 13 cuts off one bag package 4 from the tube 9 subsequent to creating crosswise seams 9.

Figure 2:
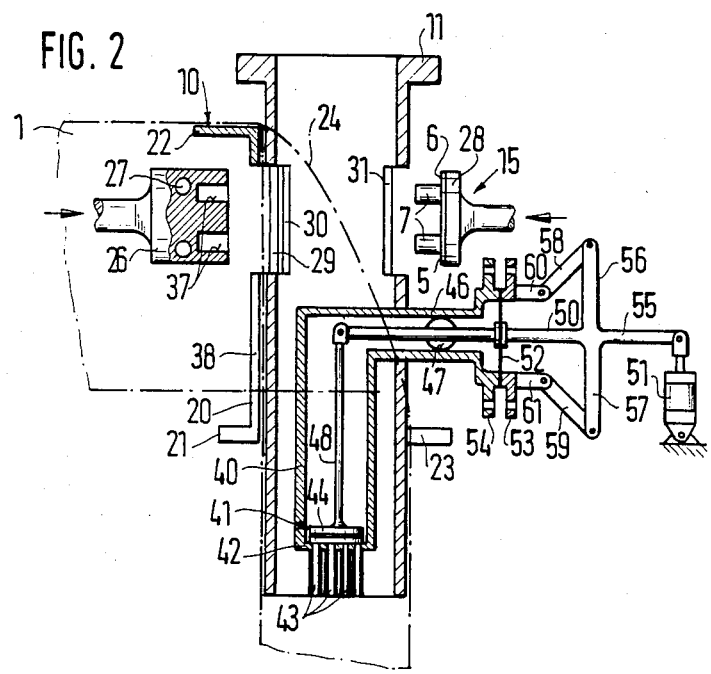
FIG. 2 shows the forming and filling device of the apparatus of FIG. 1 in cross section.

For filling the bag packages 4 with one amount at a time of a liquid product, a filling tube 40, Fig. 2, is disposed coaxially in the forming tube 11, with an apportioning valve 41 disposed at the lower end of the filling tube. This apportioning valve 41 has a valve seat plate 42 with a plurality of downwardly extending outlet tubes 43 as well as a valve plate 44 that is movable in the filling tube 40 toward the valve seat plate 44. The upper end of the filling tube 40 is slightly below the working range of the fastening device 15 and there communicates with a supply fitting 46 that penetrates the forming tube 11 crosswise. Discharging in turn into this supply fitting 46 is a filling line 47, through which the liquid product to be dispensed into the packages is supplied.

For metering the individual amounts of the product, the valve plate 44 is raised from time to time from the valve seat plate 42. To this end, the valve plate 44 is secured to a rod 48, which extends in the filling tube 40 up to the height of the supply fitting 46 and the upper end of which is pivotably attached to one end of a lever 50. For actuating the lever 50, an adjusting cylinder 51 is pivotably attached to the other end of the lever.

The opening of the supply fitting 46 opposite the filling tube 40 is closed with a flexible wall in the form of a diagraphm 52, which is fastened with a ring flange 53 having a flange 54 to the end of the supply fitting 46. In its middle, the diaphragm 52 is also tightly connected to the lever 50. For pivoting the lever 50 about an axis that passes through the middle of the diaphragm 52, the lever 50 has two crosswise arms 56, 57 on its arm 55 extending outside the supply fitting 46. The ends of the crosswise arms 56, 57 are pivotably attached to connecting rods 58, 59, which are supported on the ring flange 53 in stationary bearings 60, 61. In one position as shown in FIG. 2., that is, the closing position of the metering valve 41, the two connecting rods 58, 59 assure a position in which their extended longitudinal axes intersect one another at the center point of the diaphragm 52 (see FIG. 2). By means of an adjusting movement of the adjusting cylinder 51, the lever 50 is pivoted clockwise, and with the aforementioned arrangement of the connecting rods 58, 59, the lever 50 is pivoted about an axis extending through the center of the diaphragm 52, and the valve plate 44 is lifted from the valve seat plate 42. To introduce one amount of liquid at a time into the end of the tube 2, the valve plate 44 is raised from the valve seat 42 each time as the tube 2 is being advanced, so that the liquid can flow out of the filling tube 40 and through the outlet tubes 43 into the clamped end of the tube 2.

In addition, it should be noted that with the above-described fastening device, it is also possible, with suitable adaptation of the holder and the stamp, to attach dispensing fitments of some other shape to the tube or to the formed bag packages.

The foregoing relates to a preferred exemplary embodiment, it being understood that other variants and embodiments thereof are possible within the spirit and scope of the invention, the latter being defined by the appended claims.

WHAT IS CLAIMED AND DESIRED TO BE SECURED BY LETTERS PATENT OF THE UNITED STATES IS:

1. An apparatus for producing liquid-filled bag packages (4) from a strip of packaging material (1) which comprises a packaging material former (10) which shapes the strip of packaging material into a tube (2), said packaging material former 10 includes a tube former 11 with a surrounding tubular filling 20, an oblique inlet opening in said forming tube, a filling tube (40) supported coaxial within said tube former and surrounded by said tube (2), a transversely extending supply fitting (46) connected to said filling tube for discharging a liquid into said filling tube, a metering valve (41) at an end of said filling tube, means for actuating said metering valve, said means including an adjusting device (51), and a rod (48) that penetrates said filling tube, a supply fitting (46) that discharges into said filling tube (40) in the vicinity of an inlet opening of said tube former (10), a rod (48) connected to said metering valves and pivotably attached to a lever (50) that extends through said supply fitting, said lever (50) has an axis of rotation located in an end-face boundary wall (52) of said supply fitting whereby a measured supply of liquid is admitted into each formed bag as each bag is formed and seated on its bottom.

2. An apparatus as defined by claim 1, in which said boundary wall comprises a flexible diaphragm (52).

3. An apparatus as defined by claim 1, in which said lever (50) includes an arm (55) which extends outside said supply fitting (46) and connects to an adjusting device (51), said lever (50) includes two crosswise arms (56, 57), each of which is pivotably attached to a respective connecting rod (58, 59) supported on said supply fitting, wherein said connecting rods are aligned in such a manner that their imaginary longitudinal axes intersect one another in the vicinity of the diaphragm (52).

4. An apparatus as defined by claim 2, in which said lever (50) includes an arm (55) which extends outside said supply fitting (46) and connects to an adjusting device (51), said lever (50) includes two crosswise arms (56, 57), each of which is pivotably attached to a respective connecting rod (58, 59) supported on said supply fitting, wherein said connecting rods are aligned in such a manner that their imaginary longitudinal axes intersect one another in the vicinity of the diaphragm (52).

5. An apparatus as defined by claim 3, in which said connecting rods (58, 59) have longitudinal axes that intersect one another in the center of the surface area of the diaphragm (52).

6. An apparatus as defined by claim 4, in which said connecting rods (58, 59) have longitudinal axes that intersect one another in the center of the surface area of the diaphragm (52).

* * * * *